May 10, 1955  H. J. AMPE  2,707,909

TWO-ROW WEEDER ATTACHMENT

Filed Nov. 7, 1950

Henry J. Ampe
INVENTOR.

BY *Clarence A. O'Brien*
*and Harvey B. Jackson*
Attorneys

United States Patent Office 2,707,909
Patented May 10, 1955

2,707,909

TWO-ROW WEEDER ATTACHMENT

Henry J. Ampe, Paynesville, Minn.

Application November 7, 1950, Serial No. 194,465

1 Claim. (Cl. 97—199)

This invention relates to improvements in farm implements.

An object of this invention is to provide an improved weeder attachment for farming operations which may be attached directly to a tractor or a cultivator, said attachment having a horizontal beam to which a tongue is attached, the connection between the tongue and the beam being of such character that a universally adjustable clamp is provided, and the beam having tines thereon with supports spaced from but connected to the beam, the supports also having tines which are arranged behind and between the tines of the beam.

Ancillary objects and features of importance will become apparent in following the description of the illustrated form of the invention.

Figure 1:
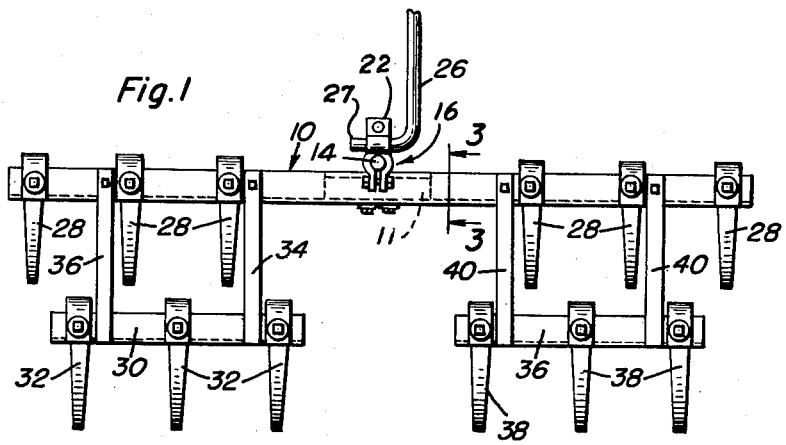
Figure 1 is a plan view of the attachment.
Figure 2:
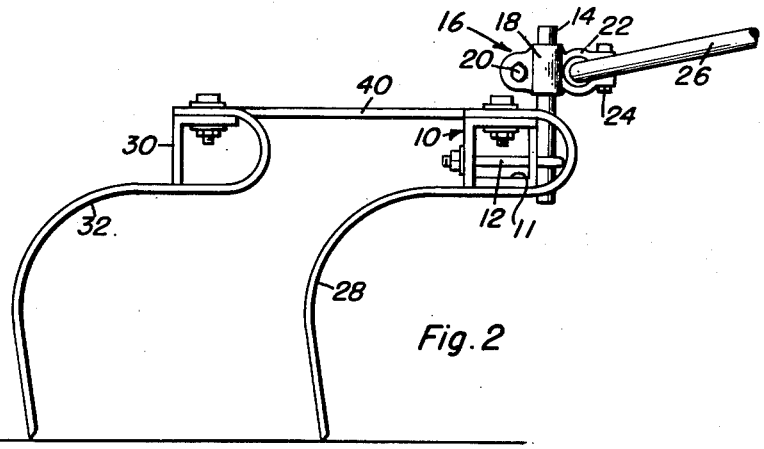
Figure 2 is an elevational view of the structure of Figure 1.
Figure 3:
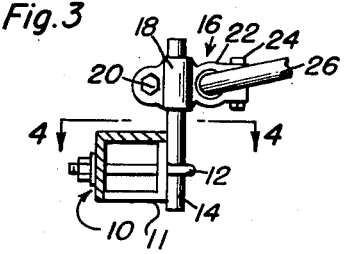
Figure 3 is an enlarged sectional view taken on the line 3—3 of Figure 1.
Figure 4:
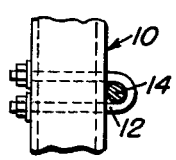
Figure 4 is a sectional view taken substantially on the line 4—4 of Figure 3.

In use of this device, many little weeds are removed from the rows and the loose soil is pushed close to crops such as corn or soy beans. Many other small weeds are covered by the soil.

Use of the device also levels the many ridges in the field so that when cultivating transversely to the rows or parallel to the rows the cultivation is much smoother and easier.

Use of the device also harrows the soil slightly around the small plants, that is, it shakes out small weeds and quackgrass.

The embodiment of the present invention which has been illustrated comprises an angle iron beam 10. Mounted beneath an intermediate portion of the beam 10 is a relatively short, complemental angle iron spacing bar 11. A vertical shank 14 is removably and adjustably clamped in position on the members 10 and 11 by a U-bolt 12.

Mounted for vertical and rotary adjustment on the shank 14 is a bracket or coupling 16. The bracket 16 includes a split, vertical clamp 18 which receives the shank 14. The bracket 16 further includes a split horizontal clamp 22 which is integral with the vertical clamp 18. Mounted for swinging movement in a vertical plane on the bracket 16 is a tongue 26 comprising a right angularly bent end portion 27 which is journalled in the clamp 22. The clamps 18 and 22 include, respectively, bolts 20 and 24.

A plurality of curved tines 28 are bolted to, or otherwise fixed to the beam 10. These tines are spaced from each other.

There is a first support 30 held in coplanar and parallel relation with the beam 10. This support is of angle construction and has a plurality of tines 32 secured thereto, the tines being arranged behind some of the tines 28 and between them.

The means fastening the support 30 to the beam 10 consists of a pair of brace bars 34 and 36 which are welded or otherwise fixed to the support 30 at their outer ends and which are releasably attached to the beam at their inner ends, as by bolts, or the like.

There is a second support 36 located in the same vertical plane and the same horizontal plane as the support 30. This second support is provided with a number of tines 38 which are held spaced from other of the tines 28, behind and between them. Brace bars 40, similar to the brace bars 34 and 36, are used to retain the second support 36 spaced from the beam 10.

Having described the invention, what is claimed as new is:

A weeder attachment of the character described comprising: an angle iron beam, a multiplicity of tines mounted on the beam, a complemental angle iron spacing bar mounted beneath said beam in opposed relation thereto, a vertical shank mounted for rotary and sliding adjustment on the beam and the bar, a U-bolt mounted on the beam, said U-bolt straddling the shank and passing through the beam and bar for clamping said shank to the beam, a bracket comprising a split, vertical clamp rotatably and slidably adjustable on the shank and further including a split horizontal clamp integral with the vertical clamp, and a draft tongue including a right angularly extending end portion journaled in the horizontal clamp for mounting said tongue on the shank for swinging movement in a vertical plane.

References Cited in the file of this patent

UNITED STATES PATENTS

| Number | Name | Date |
|---|---|---|
| 811,517 | McCune | Jan. 30, 1906 |
| 983,382 | Mahan | Feb. 7, 1911 |
| 987,286 | Dengel | Mar. 21, 1911 |
| 1,122,837 | Young | Dec. 29, 1914 |
| 1,132,563 | Corathers | Mar. 23, 1915 |
| 1,612,855 | Davidson | Jan. 4, 1927 |
| 2,075,220 | Neuhausen | Mar. 30, 1937 |
| 2,171,451 | Madden | Aug. 29, 1939 |

FOREIGN PATENTS

| 6,349 | Great Britain | 1898 |
| 109,670 | Great Britain | Jan. 24, 1940 |